US007758661B2

(12) United States Patent
Gaus et al.

(10) Patent No.: US 7,758,661 B2
(45) Date of Patent: Jul. 20, 2010

(54) METHOD FOR FORMING COMPRESSED STRUCTURES USING BYPRODUCTS OF BIODIESEL PRODUCTION AS A BINDING AGENT

(75) Inventors: John Paul Gaus, Watertown, NY (US); Philip D. Leveson, Hannawa Falls, NY (US)

(73) Assignee: Zeropoint Clean Tech, Inc., Potsdam, NY (US)

( * ) Notice: Subject to any disclaimer, the term of this patent is extended or adjusted under 35 U.S.C. 154(b) by 336 days.

(21) Appl. No.: 11/874,408

(22) Filed: Oct. 18, 2007

(65) Prior Publication Data

US 2008/0092438 A1  Apr. 24, 2008

Related U.S. Application Data

(60) Provisional application No. 60/862,139, filed on Oct. 19, 2006.

(51) Int. Cl.
*C10L 5/14* (2006.01)
(52) U.S. Cl. .............................. 44/551; 44/579; 44/593
(58) Field of Classification Search ................... 44/550, 44/551, 589, 590, 607, 905, 579, 593, 605
See application file for complete search history.

(56) References Cited

U.S. PATENT DOCUMENTS

| 1,724,393 | A | * | 8/1929 | Carpenter et al. | ...... 106/165.01 |
| 5,972,057 | A | * | 10/1999 | Hayafuji et al. | ............... 44/388 |
| 6,818,027 | B2 | * | 11/2004 | Murcia | ........................ 44/550 |
| 2001/0013197 | A1 | * | 8/2001 | White | ........................ 44/552 |

OTHER PUBLICATIONS

Search Report and Written Opinion for International Patent Application No. PCT/US2007/081885; Mar. 7, 2008.

* cited by examiner

*Primary Examiner*—Ellen M McAvoy
*Assistant Examiner*—Pamela Weiss
(74) *Attorney, Agent, or Firm*—Jason A. Bernstein; Charles L. Warner; Bryan Cave LLP

(57) ABSTRACT

A method for forming compressed matter structures suitable as a fuel source comprising producing a glycerine-rich binding agent by a method comprising (i) providing a feedstock, (ii) mixing the feedstock with an alcohol and a catalyst to form a reaction product, (iii) obtaining a glycerine-rich phase from the reaction product; providing a carbon-containing material; adding an effective amount of the glycerine-rich phase to the carbon-containing material to form a mixture; and forming compressed material from the mixture. Also provided is a compressed structure produced by the method.

4 Claims, No Drawings

METHOD FOR FORMING COMPRESSED STRUCTURES USING BYPRODUCTS OF BIODIESEL PRODUCTION AS A BINDING AGENT

CROSS-REFERENCE TO RELATED APPLICATION

This application claims benefit of co-pending U.S. provisional patent application No. 60/862,139, filed Oct. 19, 2006, entitled BINDING AGENT FROM BIODIESEL PRODUCTION FOR USE IN AGGLOMERATION OF CARBON CONTAINING COMPOUNDS AND A METHOD OF PRODUCTION OF BINDING AGENTS, and commonly assigned to the assignee of the present application, the disclosure of which is incorporated by reference in its entirety herein.

TECHNICAL FIELD

The present disclosure relates to the use of co-products of biodiesel production as a binding agent used to aid in the agglomeration of carbon-containing solids to form pellets, briquettes or other compressed structures, which can be used as a feedstock for gasification and/or combustion systems.

BACKGROUND

Biodiesel is a long chained alkyl ester produced by the esterification or transesterification of triglycerides. Its color ranges from water-white to a straw-like yellow. Typical feedstocks include vegetable oils (soy and rapeseed are most popular), animal tallows and yellow grease. The reaction is summarized below:

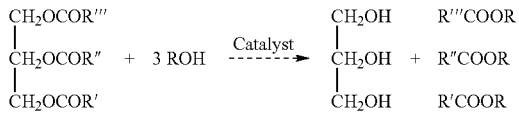

Typically methanol is used as the alcohol and sodium hydroxide or sodium methylate as the catalyst. Currently, in the U.S., the majority of biodiesel is produced using batch technology. The oil is preheated to around 150 degrees F. (about 65.5 degrees C.) and the alcohol and catalyst are added. The mixture is stirred for around 1-2 hours after which agitation is stopped. The reaction proceeds and the glycerine co-product, which is immiscible with the alkyl ester, falls to the bottom of the reactor. Once the reaction has proceeded to the required point, the glycerine is decanted off and the biodiesel top phase is further purified.

Often the oil to be processed contains appreciable amounts of free fatty acids (FFAs). In this case the FFAs react with the alkali catalyst to produce soaps. These soaps separate out with the glycerine phase, the impact is to reduce the process yield and to reduce the purity of the glycerine phase.

The U.S. biodiesel industry is currently in its infancy and annual production in 2008 is estimated to be around 260 million gallons (about $9.84 \times 10^8$ liters). However, it is thought that this figure may reach 2.5 billion gallons (about $9.46 \times 10^9$ liters) in the short term future. The majority of the biodiesel is blended with petroleum derived diesel ("petrodiesel") in a ratio of 20% biodiesel to 80% petrodiesel, the fuel is known as B20. B20 is a direct replacement to diesel fuel and generally approved by the automobile and agriculture industry and as such does not invalidate engine warranties.

Fixed bed gasifier and combustion systems typically require that the fuel utilized is of a sufficient size to be supported by a grate. Typically this requires that a biomass have at least one characteristic length be in the range of about ⅛" to 2" (about 0.31 to 5.08 cm). For some carbon-containing feedstocks, including coal and wood the solid can be ground or chipped and graded such that this requirement is met. However, many feedstocks have typical characteristic lengths less than this requirement. In this case pelletization or briquetting techniques can be used to increase the typical characteristic lengths of the feedstock, thus making the feedstock suitable for fixed bed-based applications. They typically apply pressure and heat to the solid to aid in the compaction.

Techniques to convert different solids into pellets or briquettes are well known. Techniques have been developed to compact non-organic powders including dust, metal chippings and ionic salts. Techniques have also been developed to produce pellets from organic materials including but limited to, sawdust, alfalfa, corn silage, dried distillers grains, bagasses and animal waste. The pellets produced through pressure and heat alone are often not of sufficient strength to survive mechanical feeding and crushing while in the fixed bed or the gasification or combustion device. The pellets produced through pressure and heat alone are often not of sufficient strength to survive mechanical feeding, thus the particle size distribution may change during feeding and a substantial volume of fine material may be formed. The formation of fines can vastly change the combustion or gasification characteristics as well as modifying the bed hydrodynamics. Also, pellets can become crushed while in the fixed bed or the gasification or combustion device, again resulting in fines formation. Components with the solids often polymerize to aid in the formation of a stable solid structure. Sometimes the solid is more difficult to process and in these cases a binding agent is often added. These binding agents act to "adhere" the smaller particles to produce the larger solid. In these cases the addition of a glycerine-rich stream would enhance the tensile strength of the final pellet.

BRIEF SUMMARY OF THE DISCLOSURE

One aspect of the present disclosure describes a process for forming pellets, briquettes or other solid structures using the glycerine-rich co-product output from biodiesel production as a binding agent to aid in the agglomeration of carbon containing solids to produce a structure suitable for grate-based gasifier and combustion systems.

Another aspect of the present invention comprises a binding agent used in the creation of pellets or briquettes. It has been shown to be a successful adhesion or binding agent for such products as hay pellets and alfalfa pellets and briquettes, and other various biomass-based products.

If desired the glycerine stream can be added at levels purely to aid the agglomeration or at much higher levels such that the glycerine provides a significant proportion of the energy contained in the pellet. It is possible to refine the purity of the glycerine through the addition of a concentrated acid. When the concentrated acid is added to the crude glycerine any soaps present are back cracked into the FFA, while the catalyst is precipitated out as a salt. However, it has been found that the glycerine-rich phase can be used unpurified thus allowing the calorific value contained in the soap to be released.

One aspect of the present disclosure provides a method for forming compressed matter structures suitable as a fuel source, comprising: (a) producing a glycerine-rich binding agent by a method comprising (i) providing a feedstock, (ii) mixing the feedstock with an alcohol and a catalyst to form a reaction product, (iii) obtaining a glycerine-rich phase from the reaction product; (b) providing a carbon-containing material; (c) adding an effective amount of the glycerine-rich phase to the carbon-containing material to form a mixture; and, (d) forming compressed material from the mixture of step c).

Another aspect of the present disclosure provides a compressed matter structure suitable as a fuel source, produced by a method, comprising producing a glycerine-rich binding agent by a method comprising (i) providing a feedstock, (ii) mixing the feedstock with an alcohol and a catalyst to form a reaction product, (iii) obtaining a glycerine-rich phase from the reaction product; providing a carbon-containing material; adding an effective amount of the glycerine-rich phase to the carbon-containing material to form a mixture; and, forming compressed material from the mixture.

Another aspect of the present disclosure provides a binding agent for use in forming compressed matter structures, comprising: a glycerine-rich byproduct of biodiesel production as the reaction of a feedstock and an alcohol in the presence of a catalyst.

Another aspect of the present disclosure provides a method for forming a release agent useful in production of compressed matter structures suitable as a fuel source, the method comprising providing a feedstock; mixing the feedstock with an alcohol and a catalyst to form a reaction product; obtaining a glycerine-rich phase from the reaction product, the glycerine-rich phase being suitable as the binding agent.

Another aspect of the present disclosure provides a method for increasing the characteristic length of a carbon-containing structure through the agglomeration of a number of smaller particles, the method comprising: producing a glycerine-rich binding agent by a method comprising (i) providing a feedstock, (ii) mixing the feedstock with an alcohol and a catalyst to form a reaction product, (iii) obtaining a glycerine-rich phase from the reaction product; providing a carbon-containing material; adding an effective amount of the glycerine-rich phase to the carbon-containing material to form a mixture; and, forming compressed material from the mixture.

DETAILED DESCRIPTION

The characteristic length of a collection of solid particles can be increased through the agglomeration of a number of smaller particles to produce a larger solid, often in the form of a pellet briquette. To aid in this fusion pressure is often used; however, in some cases pressure alone is not sufficient to cause sufficient agglomeration to produce a particle with the desired mechanical properties. In this case a binder can added to the mix to aid in the adhesion of the particles.

It has been found that the co-products produced during the conversion of vegetable oil into alkyl esters are very effective in the bonding of carbon containing powders into larger structures such as pellets or briquettes. The co-products of biodiesel production include glycerin, soap and alkali catalysts. Often residual methanol or lower order alcohol is also present. If a refined oil is being processed the co-product is a glycerine-rich phase. This phase has been found to promote the agglomeration of biomass to produce larger pellets and/or briquettes. Beneficial effects have been found using low amounts of glycerine but it has also been found that, if desired, much larger quantities, as large as 60% by mass have been successfully used. In the latter case the glycerine-rich phase acts both as a binder and a significant contributor to the overall calorific energy content of the particle. If a less refined oil is used often appreciable amounts of soap are present in the glycerine phase. Again this mixture has been found to have the ability to aid in the agglomeration of carbon containing powders to produce larger structures.

In both cases a significant quantity of the catalyst used during the transesterification is present in the glycerine phase. The mixture containing the catalyst can be used directly but it may be advantageous to remove the catalyst prior to its use as a binder. The catalyst can be precipitated out of the glycerine phase by adding small quantities of acid to neutralize the catalyst and cause the precipitation of an ionic salt.

The glycerine-rich phase can also be used as a mold release agent to facilitate release of pellets or briquettes.

While pellets and briquettes are discussed herein as examples of structures being formable according to the present invention, the present invention is intended to include any compressed matter structure which can be formed using a glycerine binding agent. Such structures, may include, but are not limited to, rods, spheres, rings, fibers, threads, mats, meshes, torus shapes, square, and other regular or irregular shaped structures.

The compressed matter structures created by the present invention may be used as a fuel source. Alternatively, such structures may be used for other purposes known to those skilled in the art.

EXAMPLES

The invention will be further described in connection with the following examples, which are set forth for purposes of illustration only. Parts and percentages appearing in such examples are by weight unless otherwise stipulated.

Example 1

This example illustrates the formulation of a pellet for fixed bed combustion or gasification processes. It is formulated to produce a pellet with enhanced physical properties and with a significant fraction of the calorific value derived from the waste biodiesel stream.

A vegetable oil or vegetable oil byproduct is used as a feedstock. Methanol is used as the alcohol. Sodium hydroxide or sodium methylate is used as the catalyst. The oil is preheated to around 150 degrees F. (about 65.5 degrees C.) and the alcohol and catalyst are added. The mixture is stirred for around 1-2 hours after which agitation is stopped. The reaction proceeds and the glycerine co-product, which is immiscible with the alkyl ester, falls to the bottom of the reactor. Once the reaction has proceeded to the required point, the glycerine is decanted off and the biodiesel top phase is further purified.

The glycerine-rich stream may consist of:
67% Glycerine
21% Soap
9% Sodium methylate
3% Methanol 90 grams of ground wood sawdust is mixed with 10 grams of the glycerine-rich biodiesel waste stream described above. The mixture is fed to a small portable pelleting extruder. The mixture produces a hard, brittle wood pellet suitable for combustion or gasifier applications.

Example 2

This example illustrates the formulation of a briquette for fixed bed combustion or gasification processes. It is formulated to produce a pellet with enhanced physical properties and with a significant fraction of the calorific value derived from the waste biodiesel stream.

The glycerine-rich material is produced as described in Example 1.

85 grams of ground wood sawdust is mixed with 15 grams of the glycerine-rich biodiesel waste stream. The mixture is fed into a briquetter. The mixture can produce a stable 2" square cross section briquette suitable for combustion or gasifier applications.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications and publications referred to herein are incorporated by reference in their entirety.

The invention claimed is:

1. A method for forming compressed matter structures suitable as a fuel source, comprising:
    a) producing a glycerine-rich binding agent by a method comprising
        i) providing a feedstock,
        ii) mixing said feedstock with an alcohol and a catalyst to form a reaction product,
        iii) obtaining a glycerine-rich phase from said reaction product;
    b) providing a carbon-containing material;
    c) adding an effective amount of a binder to said carbon-containing material to form a mixture, said binder consisting of said glycerine-rich phase; and
    d) forming compressed material from said mixture.

2. A method for increasing the characteristic length of a carbon-containing structure through the agglomeration of a number of smaller particles, said method comprising:
    a) producing a glycerine-rich binding agent by a method comprising
        i) providing a feedstock,
        ii) mixing said feedstock with an alcohol and a catalyst to form a reaction product,
        iii) obtaining a glycerine-rich phase from said reaction product;
    b) providing a carbon-containing powder;
    c) adding an effective amount of a binder to said carbon-containing powder to form a mixture, said binder consisting of said glycerine-rich phase; and
    d) forming compressed material from said mixture.

3. The method of claim 1 wherein said glycerine-rich phase obtained from said reaction product comprises glycerin and a soap.

4. The method of claim 2 wherein said glycerine-rich phase obtained from said reaction product comprises glycerin and a soap.

* * * * *